United States Patent
Mizusawa et al.

(10) Patent No.: US 7,039,059 B2
(45) Date of Patent: May 2, 2006

(54) VOIP GATEWAY DEVICE AND DIGITAL ONE-LINK TANDEM EXCHANGE METHOD

(75) Inventors: Tsunetoshi Mizusawa, Tokyo (JP); Toshie Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 927 days.

(21) Appl. No.: 09/962,123

(22) Filed: Sep. 26, 2001

(65) Prior Publication Data

US 2002/0037002 A1 Mar. 28, 2002

(30) Foreign Application Priority Data

Sep. 27, 2000 (JP) .............................. 2000-299122

(51) Int. Cl.
*H04L 12/28* (2006.01)
*H04L 12/56* (2006.01)

(52) U.S. Cl. ...................... 370/401; 370/235; 370/392; 370/467

(58) Field of Classification Search ................ 370/235, 370/352, 389, 392, 469, 400, 401, 410, 428, 370/466, 467, 471, 477
See application file for complete search history.

(56) References Cited

U.S. PATENT DOCUMENTS 6,275,574 B1 * 8/2001 Oran ..................... 379/201.01

2002/0196790 A1 * 12/2002 Koistinen .................. 370/400

FOREIGN PATENT DOCUMENTS

JP 10-336332 12/1998

* cited by examiner

*Primary Examiner*—Afsar Qureshi
(74) *Attorney, Agent, or Firm*—Foley & Lardner LLP

(57) ABSTRACT

A VoIP (Voice over IP network) gateway device includes an identification pattern inserting section, identification pattern detecting section, pass through frame assembly section, and pass through frame processing section. The identification pattern inserting section inserts an identification pattern of a predetermined bit pattern in a receiving signal from an IP transit trunk, and sends out the signal to a digital exchange. The identification pattern detecting section detects an identification pattern from a receiving signal from the digital exchange. The pass through frame assembly section converts an RTP (Real-time Transport Protocol) packet obtained from the IP transit trunk into a digital voice signal in a pass through frame format having a bit rate of 64 kbps when the identification pattern detecting section detects an identification pattern. The pass through frame processing section converts a digital voice signal in the pass through frame format received from the digital exchange into an RTP packet when the identification pattern detecting section detects no identification pattern. A digital one-link tandem exchange method is also disclosed.

18 Claims, 6 Drawing Sheets

| BIT | 7 | 6 | 5 | 4 | 3 | 2 | 1 | 0 |
|---|---|---|---|---|---|---|---|---|
| BYTE 0 | P7 | P6 | P5 | P4 | P3 | P2 | P1 | P0 |
| 1 | P7 | P6 | P5 | P4 | P3 | P2 | P1 | C |
| 2 | P7 | P6 | P5 | P4 | P3 | P2 | P1 | P0 |
| 3 | P7 | P6 | P5 | P4 | P3 | P2 | P1 | P0 |
| 4 | P7 | P6 | P5 | P4 | P3 | P2 | P1 | P0 |
| 5 | P7 | P6 | P5 | P4 | P3 | P2 | P1 | P0 |
| 6 | P7 | P6 | P5 | P4 | P3 | P2 | P1 | P0 |
| 7 | P7 | P6 | P5 | P4 | P3 | P2 | P1 | C |

FIG. 4

| BIT | 7 | 6 | 5 | 4 | 3 | 2 | 1 | 0 |
|---|---|---|---|---|---|---|---|---|
| BYTE 0 | 0-D15 | 0-D14 | 0-D13 | 0-D12 | 0-D11 | 0-D10 | 0 | 1 |
| 1 | 0-D9 | 0-D8 | 0-D7 | 0-D6 | 0-D5 | 0-D4 | 0 | C |
| 2 | 0-D3 | 0-D2 | 0-D1 | 0-D0 | 1-D15 | 1-D14 | 0 | 1 |
| 3 | 1-D13 | 1-D12 | 1-D11 | 1-D10 | 1-D9 | 1-D8 | 0 | 1 |
| 4 | 1-D7 | 1-D6 | 1-D5 | 1-D4 | 1-D3 | 1-D2 | 0 | 1 |
| 5 | 1-D1 | 1-D0 | 2-D15 | 2-D14 | 2-D13 | 2-D12 | 0 | 1 |
| 6 | 2-D11 | 2-D10 | 2-D9 | 2-D8 | 2-D7 | 2-D6 | 0 | 1 |
| 7 | 2-D5 | 2-D4 | 2-D3 | 2-D2 | 2-D1 | 2-D0 | 0 | C |
| ... | | | | | | | | |
| 28 | 10-D8 | 10-D7 | 10-D6 | 10-D5 | 10-D4 | 10-D3 | 0 | 1 |
| 29 | 10-D1 | 10-D0 | 1 | 1 | 1 | 1 | 1 | 1 |
| 30 | 1 | 1 | 1 | 1 | 1 | 1 | 1 | 1 |
| 31 | 1 | 1 | 1 | 1 | 1 | 1 | 1 | C |

FIG. 6

VOIP GATEWAY DEVICE AND DIGITAL ONE-LINK TANDEM EXCHANGE METHOD

BACKGROUND OF THE INVENTION

The present invention relates to a VoIP (Voice over IP network) gateway device and a digital one-link tandem exchange method which use a voice compression technique and packet transmission technique for a transmission line between exchanges or PBXs (Private Branch exchanges) and, more particularly, to a VoIP (Voice over IP network) gateway device and a digital one-link tandem exchange method which accommodate a plurality of IP (Internet Protocol) transit trunks in a digital exchange through a VoIP gateway that is set between the digital exchange and digital transit trunk having different transmission bit rates to perform high-efficiency coding/decoding of digital voice signals and packet transmission, thereby exchanging digital voice signals between these digital transit trunks and other digital transit trunks or intra-station extensions.

Recently, in a toll dial network using exchanges or PBXs, high-efficiency voice coding has generally been used for transmission lines. Since a deterioration in sound quality occurs upon repetition of high-efficiency voice coding and decoding, a digital one-link function is realized by some technique. The digital one-link function is a tandem exchange scheme of preventing sound quality from deterioration due to coding/decoding and an increase in circuit delay due to a processing delay by transmitting path data from a transit trunk exchange using tandem connection as coded data.

In recent years, with an increase in IP traffic typified by the explosive growth of the Internet, data and voice traffics have generally been integrated by the IP protocol. That is, the application of a VoIP gateway device to a PBX transmission line has become popular.

A tandem exchange system using a combination of a high-efficiency voice coder and TDM (Time Division Multiplex) for a transmission line has been proposed in Japanese Patent Laid-Open No. 10-336332. In this system, two high-efficiency coders which are accommodated in an exchange and oppose each other through a transit path insert predetermined sync signals in signals to be output to the respective destinations through the exchange. On the receiving side, upon detection of a sync signal, the coding and decoding sections are bypassed to prevent repetition of coding/decoding. If this technique is applied to a tandem system for performing packet transmission using an IP transit trunk, the problem of a delay due to buffering performed in a jitter buffer cannot be solved.

A conventional toll dial network in which a VoIP gateway device is applied to a transmission line has implemented the digital one-link function by IP routing using the exchange function of the VoIP gateway device.

An in-house telephone exchange system using a PBX implements various kinds of additional functions such as a PHS (Personal Handy-phone System) roaming function which the PBX has and a charging function. To activate these functions, the transit trunks in the PBX must be connected to each other in a one-to-one correspondence. This system corresponds to a conventional system using a TDM. In a toll dial network using a VoIP gateway device for a transmission line, in order to realize the above connection, a digital one-link function must be implemented independently of the exchange function (IP routing) of the VoIP gateway device.

The toll dial network using the VoIP gateway device for a transmission line, however, implements the digital one-link function by IP routing using the exchange function of the VoIP gateway device. For this reason, transit trunks in the PBX cannot be connected to each other in a one-to-one correspondence, and hence the additional functions of the PBX cannot be used.

SUMMARY OF THE INVENTION

It is an object of the present invention to provide a VoIP gateway device and digital one-link tandem exchange method which can implement a digital one-link function independently of the exchange function of the VoIP gateway device even in a case where the VoIP gateway device is applied to a transmission line, and realize a network in the form that allows transit trunks in a PBX to be connected to each other in a one-to-one correspondence, thereby allowing the use of the additional functions of the PBX.

In order to achieve the above object, according to the present invention, there is provided a VoIP (Voice over IP network) gateway device connected between a digital exchange for performing intra- and inter-office tandem exchange of a 64-kbps PCM (Pulse Code Modulation) digital voice signal and an IP (Internet Protocol) transit trunk, comprising identification pattern insertion means for inserting an identification pattern of a predetermined bit pattern in a receiving signal from the IP transit trunk, and sending out the signal to the digital exchange, identification pattern detection means for detecting an identification pattern from the receiving signal from the digital exchange, first frame conversion means for converting an RTP (Real-time Transport Protocol) packet obtained from the IP transit trunk into a digital voice signal in a pass through frame format having a bit rate of 64 kbps when the identification pattern detection means detects an identification pattern, and second frame conversion means for converting a digital voice signal in the pass through frame format received from the digital exchange into an RTP packet when the identification pattern detection means detects an identification pattern.

BRIEF DESCRIPTION OF THE DRAWINGS

FIG. 4 is a view showing an example of the data format of a PCM signal in which an identification pattern according to the present invention is inserted;

FIG. 6 is a view showing an example of the data format of a pass through frame according to the present invention.

DESCRIPTION OF THE PREFERRED EMBODIMENT

The present invention will be described in detail below with reference to the accompanying drawings.

Figure 1:
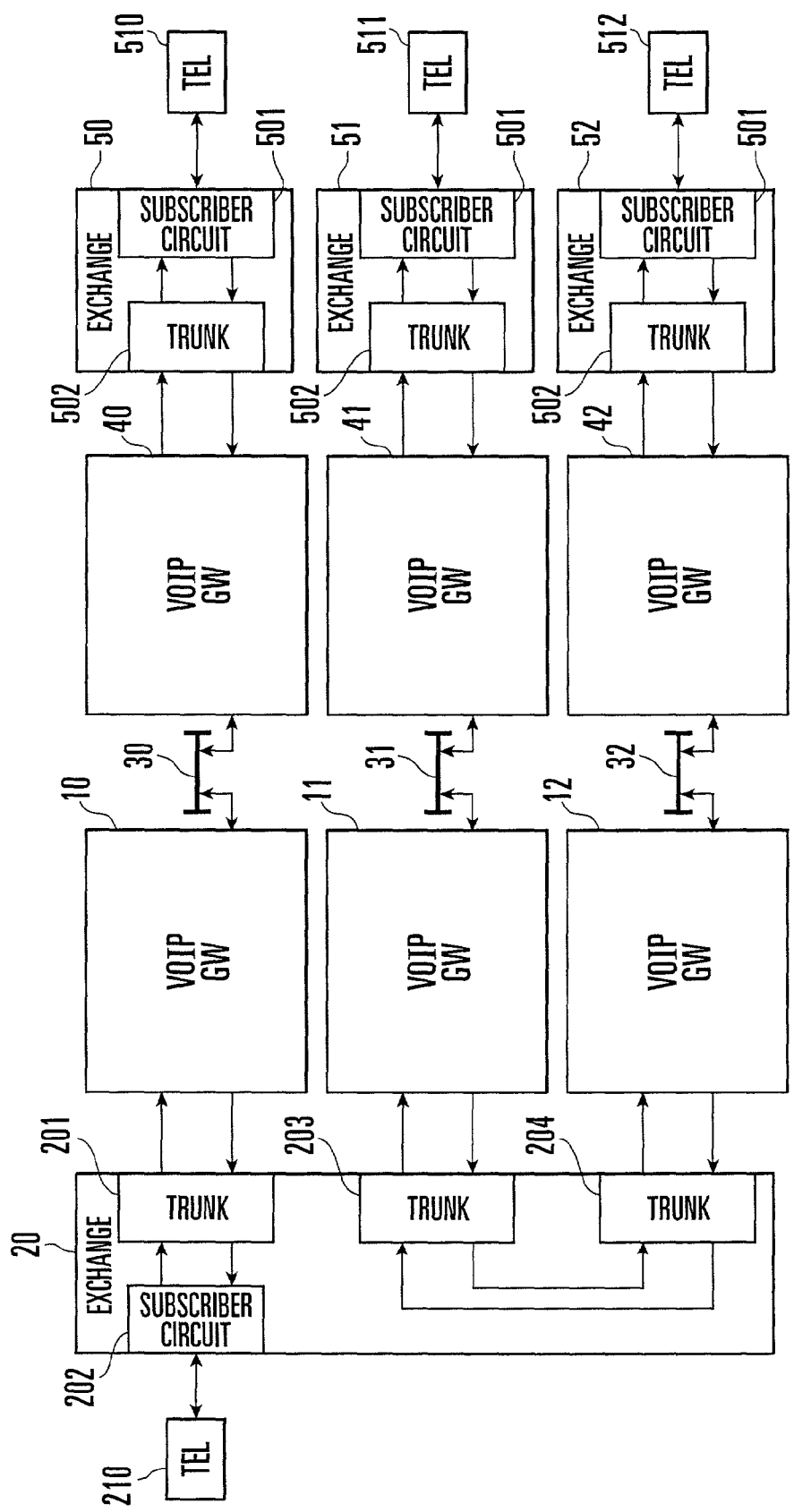
FIG. 1 is a block diagram showing a digital one-link tandem exchange system according to an embodiment of the present invention.

FIG. 1 shows a tandem exchange system to which a VoIP gateway device according to an embodiment of the present invention is applied. FIG. 1 shows only a portion associated with a voice signal. The VoIP gateway device according to this embodiment conforms to ITU-T (International Telecommunication Union-Telecommunication standardization sector) H. 323, and uses a high-efficiency coding scheme conforming to ITU-T G. 729.

The tandem exchange system shown in FIG. 1 is comprised of telephone sets 210 and 510 to 512, an exchange 20 to which the telephone set 210 is connected, exchanges 50 to 52 to which the telephone sets 510 to 512 are respectively connected, VoIP gateway devicees (VoIP GWs) 10 to 12 connected to the exchange 20, VoIP gateway devicees (VoIP GWs) 40 to 42 respectively connected to the exchanges 50 to 52, IP transit trunks 30 to 32 for respectively connecting the VoIP gateway devicees 10 to 12 to the VoIP gateway devicees 40 to 42.

The exchange 20 includes a subscriber circuit 202 to which the telephone set 210 is connected and trunks 201, 203, and 204 to which the VoIP gateway devicees 10 to 12 are respectively connected. The trunk 201 is connected to the subscriber circuit 202, and the trunks 203 and 204 are connected to each other. The exchanges 50 to 52 respectively have subscriber circuits 501 to which the telephone sets 510 to 512 are connected and trunks 502 to which the VoIP gateway devicees 40 to 42 are connected.

Figure 2:
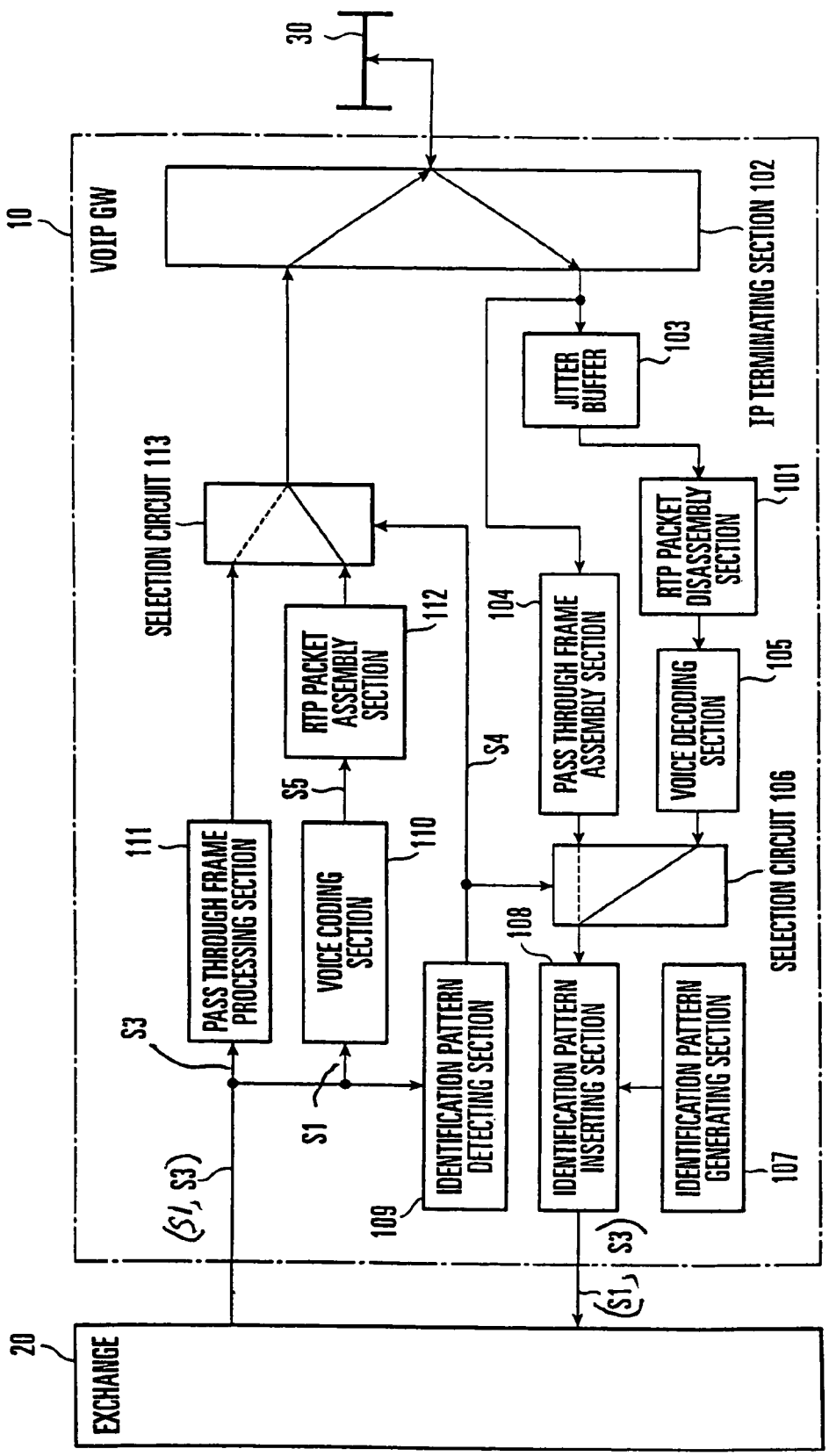
FIG. 2 is a block diagram showing a first VoIP gateway device in FIG. 1.

FIG. 2 shows the VoIP gateway device 10. The VoIP gateway devicees 10 to 12 have the same arrangement. The VoIP gateway device 10 includes a voice coding section 110 which receives a signal from the exchange 20, a pass through frame processing section 111 which receives a signal from the exchange 20, a RTP (Real-time Transport Protocol) packet assembly section 112, an identification pattern detecting section 109 which receives a signal from the exchange 20, a selection circuit 113 for selecting each of outputs from the pass through frame processing section 111 and RTP packet assembly section 112 in accordance with an output from the identification pattern detecting section 109, and an IP terminating section 102 which receives an output from the selection circuit 113 and outputs it to the IP transit trunk 30, and also receives an output from the IP transit trunk 30.

The VoIP gateway device 10 further includes a jitter buffer 103 which receives an output from the IP terminating section 102, an RTP packet disassembly section 101 which receives an output from the jitter buffer 103, a voice decoding section 105 which receives an output from the RTP packet disassembly section 101, a pass through frame assembly section 104 which receives an output from the IP terminating section 102, a selection circuit 106 for selecting each of outputs from the pass through frame assembly section 104 and voice decoding section 105 in accordance with an output from the identification pattern detecting section 109, an identification pattern generating section 107 for generating an identification pattern, and an identification pattern inserting section 108 which receives each of outputs from the selection circuit 106 and identification pattern generating section 107 and outputs it to the exchange 20.

The voice coding section 110 band-compresses a 64-kbps PCM (Pulse Code Modulation) voice signal S1 by code-converting it into an 8-kbps high-efficiency coded voice signal S5 by CS-ACELP (ITU-T G. 729). The 8-kbps high-efficiency coded voice signal S5 is output to the RTP packet assembly section 112.

The RTP packet assembly section 112 assembles the 8-kbps high-efficiency coded voice signal S5 from the voice coding section 110 into an RTP packet. The assembled RTP packet is output to the selection circuit 113. The pass through frame processing section 111 removes an invalid signal including an identification pattern from a digital voice signal S3 in a pass through frame format received from the exchange 20 on the basis of the delimiter information of the RTP packet which is contained in the signal, thereby converting the signal into an RTP packet.

The identification pattern detecting section 109 monitors the 64-kbps PCM voice signal S1 received from the exchange 20 and the digital voice signal S3 in the pass through frame format to detect an identification pattern. If an identification pattern is detected, an ON signal is output to the selection circuits 113 and 106. If no identification pattern is detected, an OFF signal is output to the selection circuits 113 and 106.

The selection circuit 113 outputs a signal from the RTP packet assembly section 112 to the IP terminating section 102 if an identification pattern detection result signal S4 from the identification pattern detecting section 109 is an OFF signal. If it is an ON signal, the selection circuit 113 outputs a signal from the pass through frame processing section 111 to the IP terminating section 102.

The IP terminating section 102 converts the RTP packet into an IP packet and transmits it to the IP transit trunk 30. The IP terminating section 102 separates the RTP packet from the IP packet received from the IP transit trunk 30. After the IP terminating section 102 separates the RTP packet from the IP packet, the jitter buffer 103 absorbs the RTP packet jitter caused in the IP transit trunk 30.

The RTP packet disassembly section 101

The RTP packet disassembly section 101 extracts only an 8-kbps high-efficiency coded voice signal from the RTP packet received through the jitter buffer 103. The voice decoding section 105 performs decoding from the extracted 8-kbps high-efficiency coded voice signal to a 64-kbps PCM voice signal.

The pass through frame assembly section 104 permutates the RTP packet from the IP terminating section 102 upon adding RTP packet delimiter information thereto, and adds an invalid signal to each free bit, thus converting the packet into the digital voice signal S3 in the pass through frame format having a bit rate of 64 kbps.

If the identification pattern detection result signal S4 from the identification pattern detecting section 109 is an OFF signal, the selection circuit 106 outputs a signal from the voice decoding section 105 to the identification pattern inserting section 108. If this signal is an ON signal, the selection circuit 106 outputs a signal from the pass through frame assembly section 104 to the identification pattern inserting section 108.

The identification pattern generating section 107 generates m-sequence data having a specific bit length as an identification signal for detecting whether the exchange 20 has performed tandem operation. The identification pattern inserting section 108 inserts the identification pattern of the bit pattern output from the identification pattern generating section 107 in the output signal from the selection circuit 106, and sends out the resultant signal to the exchange 20.

As described above, the exchange 20 accommodates the telephone set 210 through the subscriber circuit 202. The exchange 20 also accommodates the IP transit trunks 30 to 32 connected to the VoIP gateway devicees 10 to 12 through the trunks 201, 203, and 204. The exchange 20 uses these components to perform exchange processing for 64-kbps digital voice signals.

The IP transit trunks 30 to 32 transmit 8-kbps high-efficiency coded voice signals as IP packets. Such signals can be multiplexed with signals from other VoIP gateway devicees (not shown) by an IP router (not shown). The other end of each of the IP transit trunks 30 to 32 is connected to a corresponding one of the telephone sets 510 to 512 through a corresponding one of the VoIP gateway devicees 40 to 42 and a corresponding one of the exchanges 50 to 52 for converting signals into 64-kbps PCM voice signals.

Figure 3:
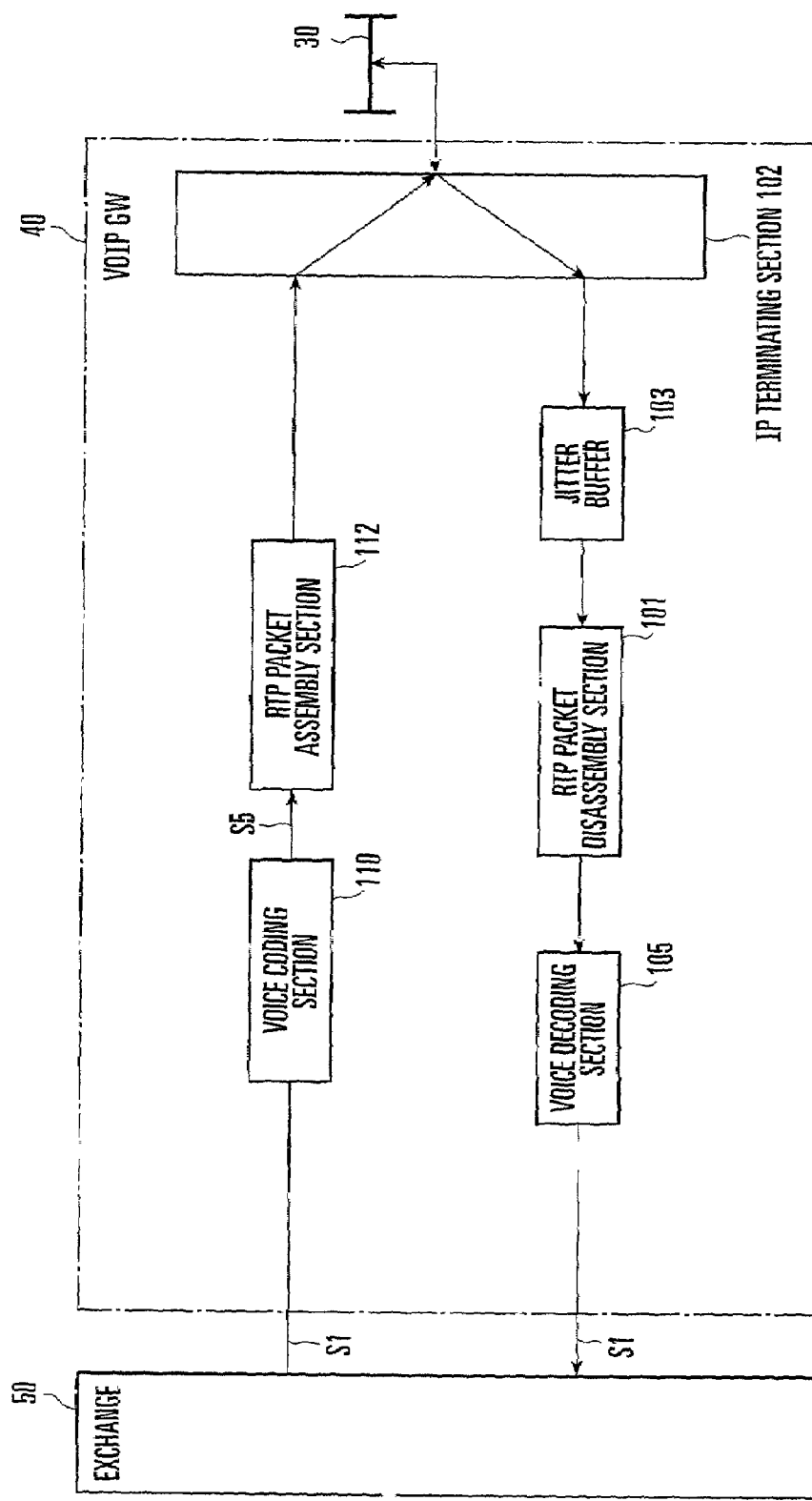
FIG. 3 is a block diagram showing a second VoIP gateway device in FIG. 1.

As shown in FIG. 3, the VoIP gateway device 40 is comprised of some elements of the VoIP gateway device 10, i.e., the voice coding section 110, RTP packet assembly section 112, IP terminating section 102, jitter buffer 103, RTP packet disassembly section 101, and voice decoding section 105. The VoIP gateway devicees 40 to 42 have the same arrangement.

By letting the VoIP gateway devicees 40 to 42 on the other end side have the same arrangement as that of the VoIP gateway device 10, tandem operation can further be performed with respect to other exchanges through the exchanges 50 to 52.

The operation of the tandem exchange system having the above arrangement will be described next. A general VoIP gateway device implements a digital one-link function by IP routing using the exchange function. The VoIP gateway device according to the present invention has no exchange function and allow trunks in the exchange to be connected to each other in a one-to-one correspondence. In the tandem exchange system shown in FIG. 1, therefore, only exchanges perform exchange operation.

Transmission/reception of voice information between voice terminals 210 and 510 formed by telephone sets will be described first. The exchange 20 receives connection information such as a dial signal through a signal receiver (not shown). If this connection information requests connection between the voice terminal 210 of the intra-office extension and the transit trunk 30, the subscriber circuit 202 is connected to the trunk 201.

The VoIP gateway device 10 receives the 64-kbps PCM voice signal S1 from the subscriber circuit 202. Since the identification pattern detecting section 109 detects no identification pattern, the identification pattern detection result signal S4 output to the selection circuits 113 and 106 remains OFF. While the identification pattern detection result signal S4 is OFF, the selection circuits 113 and 106 respectively select outputs from the RTP packet assembly section 112 and voice decoding section 105.

For the 64-kbps PCM voice signal S1 to be output to the exchange 20, the identification pattern inserting section 108 replaces one least significant bit (LSB) of PCM coded data with an indication pattern of a predetermined bit pattern (bit steal) for every six samples. As the bit pattern of this identification patter, an "m"-sequence pattern is used. FIG. 4 shows the data format of a PCM voice signal in which this identification pattern is inserted. Referring to FIG. 4, a identification pattern C is inserted for every six samples. Note that the identification pattern detecting section 109 has backward alignment guard time steps long enough to prevent a synchronous detection error. Only several forward alignment guard time steps or less are required because almost no circuit error occurs.

The PCM voice signal S1 having sync signals inserted and output from the VoIP gateway device 10 is output as voice from the voice terminal 210 through the subscriber circuit 202. Since the insertion frequency of sync signals is low, and the least significant bit of the PCM code is simply replaced, the above operation has almost no influence on the quality of the output voice. As described above, transmission/reception of voice information between the voice terminals 210 and 510 is performed by using the transmission systems constituted by the voice coding sections 110 and RTP packet assembly sections 112 of the VoIP gateway devicees 10 and 40 and the reception systems constituted by the jitter buffers 103, RTP packet disassembly sections 101, and voice decoding sections 105.

Transmission/reception of voice information between the voice terminals 511 and 512 will be described next. The exchange 20 receives connection information such as a dial signal through the signal receiver (not shown). If this connection information is connection information requesting tandem operation between the IP transit trunks 31 and 32, the trunks 203 and 204 are connected to each other.

In the initial state, the identification pattern inserting sections 108 of the VoIP gateway devicees 11 and 12 insert the identification patterns generated by the identification pattern generating sections 107 in 64-kbps PCM voice signals received through the jitter buffers 103, the RTP packet disassembly sections 101, and voice decoding sections 105, and output the resultant signals to the exchange 20. These signals transparently pass through the exchange 20 to be input to the identification pattern detecting sections 109 of the VoIP gateway devicees 11 and 12.

Each identification pattern detecting section 109 detects an identification pattern from the input signal, and outputs the identification pattern detection result signal (ON signal) S4 to the selection circuits 113 and 106. Since the detection result signal S4 is an ON signal, the selection circuits 113 and 106 respectively switch to the output sides of the pass through frame processing section 111 and pass through frame assembly section 104.

Figure 5:
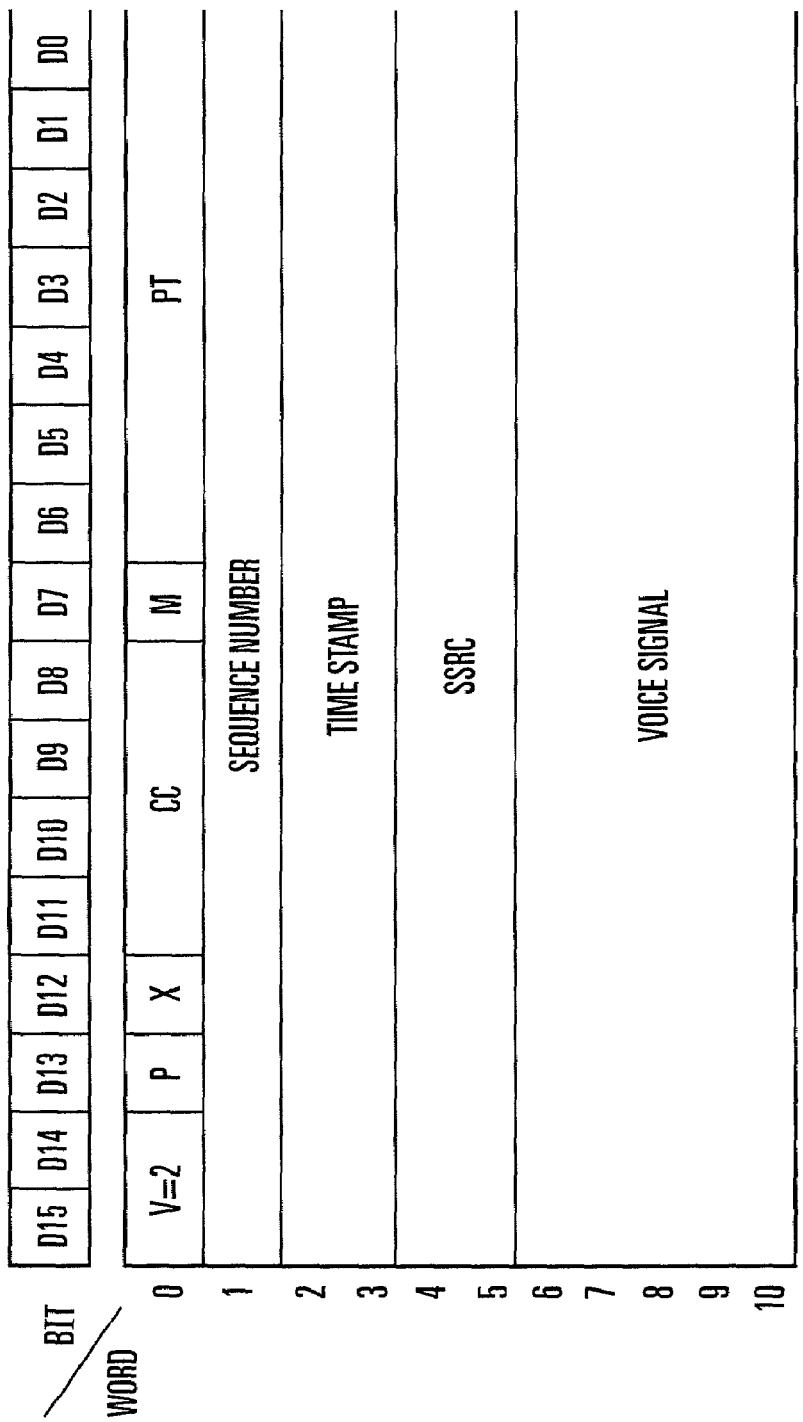
FIG. 5 is a view showing an example of the data format of an RTP packet according to the present invention.

The IP terminating sections 102 separate RTP packets from the IP packets received from the IP transit trunks 31 and 32. FIG. 5 shows an example of the data format of this RTP packet. Each pass through frame assembly section 104 converts the RTP packet input from the IP terminating section 102 into a pass through frame. FIG. 6 shows an example of the format of this pass through frame.

Referring to FIG. 6, this pass through frame is obtained by mapping an RTP packet in BIT 7 to BIT 2 (6 bits) in the 64-kbps voice signal and filling each portion having no packet data with "1". BIT#1 (1 bit) is used as a control signal representing a delimiter of the pass through frame. In this case, "0" indicates the presence of packet data, and "1" indicates the absence of packet data. BIT#0 (1 bit) for the identification pattern C is fixed to "1" in an output from each pass through frame assembly section 104.

The identification pattern inserting section 108 inserts an identification pattern in BIT#0 of the pass through frame and outputs the resultant signal as a 64-kbps pseudo-voice signal S3 to the exchange 20. The 64-kbps pseudo voice signals S3 output from the VoIP gateway devicees 11 and 12 transparently pass through the exchange 20 to be input to the opposite sides.

Each pass through frame processing section 111 monitors BIT#1 from the 64-kbps pseudo-voice signal S3 received from the exchange 20, and picks up a prescribed number of BITs from BIT#7 to BIT#2 on the basis of BYTEs which have changed from "1" to "0", thereby converting them into an RTP packet.

As described above, when the exchange 20 serves as a tandem exchange, the voice coding sections 110, RTP packet assembly sections 112, voice decoding sections 105, RTP packet disassembly sections 101, and jitter buffers 103 of the VoIP gateway devicees 11 and 12 are bypassed. In transmitting/receiving voice information between the voice terminals 511 and 512, voice coding/decoding and buffering by each jitter buffer need to be performed only once. This makes it possible to suppress an increase in delay without causing any deterioration in voice quality.

After the speech communication is over, silent PCM voice signals are input to the VoIP gateway devicees 11 and 12 to release the transit path between the trunks 203 and 204. Each identification pattern detecting section 109 stops detecting an identification pattern, and each of the selection circuits 106 and 113 returns to its initial state (FIG. 4).

Note that the above embodiment is merely an example of the preferred embodiment of the present invention. The present invention is not limited to this and can be variously modified within the spirit and scope of the invention.

As has been described above, according to the present invention, in performing transmission/reception of voice information between voice terminals that demand tandem operation of an exchange, high-efficiency voice coding and decoding need to be performed only once, thereby eliminating a deterioration in voice quality.

In addition, since the jitter buffer at a tandem portion is bypassed, buffering by the jitter buffer which is indispensable to packet transmission needs to be performed only once. This makes it possible to suppress an increase in delay which seriously affects the voice quality.

What is claimed is:

1. A VoIP (Voice over IP network) gateway device connected between a digital exchange for performing intra- and inter-office tandem exchange of a 64-kbps PCM (Pulse Code Modulation) digital voice signal and an IP (Internet Protocol) transit trunk, comprising:

identification pattern insertion means for inserting an identification pattern of a predetermined bit pattern in a receiving signal from the IP transit trunk, and sending out the signal to the digital exchange;

identification pattern detection means for detecting an identification pattern from the receiving signal from the digital exchange;

first frame conversion means for converting an RTP (Real-time Transport Protocol) packet obtained from the IP transit trunk into a digital voice signal in a pass through frame format having a bit rate of 64 kbps, an output of said first frame conversion means passed to said exchange when said identification pattern detection means detects an identification pattern; and second frame conversion means for converting a digital voice signal in the pass through frame format received from the digital exchange into an RTP packet, an output of said second frame conversion means passed to said transit trunk when said identification pattern detection means detects said identification pattern.

2. A device according to claim 1, further comprising:

coding means for performing code conversion of a 64-kbps PCM digital voice signal received from the digital exchange, in accordance with a high-efficiency coding rule with a low bit rate when said identification pattern detection means detects no identification pattern;

RTP packet assembly means for assembling an output signal from said coding means into an RTP packet;

IP terminating means for converting the RTP packet output from said RTP packet assembly means into an IP packet, sending out the packet to the IP transit trunk, and converting an IP packet received from the IP transit trunk into an RTP packet;

jitter buffer means for absorbing jitter in an RTP packet which is caused in the IP transit trunk;

RTP packet disassembly means for disassembling a coded voice signal from the RTP packet output from said jitter buffer means; and decoding means for performing decoding of the voice signal output from said RTP packet disassembly means and outputting the signal as a 64-kbps PCM digital voice signal.

3. A device according to claim 2, further comprising:

first selection means for selecting one of the digital voice signal in the pass through frame format output from said first frame conversion means and the 64-kbps PCM digital voice signal output from said decoding means, and outputting the selected signal to said identification pattern insertion means; and second selection means for selecting one of the RTP packet output from said second frame conversion means and the RTP packet output from said RTP packet assembly means, and outputting the selected signal to said IP terminating means.

4. A device according to claim 3, wherein when said identification pattern detection means detects an identification pattern, said first selection means selects the digital voice signal in the pass through frame format output from said first frame conversion means, and said second selection means selects the RTP packet output from said second frame conversion means, and when said identification pattern detection means detects no identification pattern, said first selection means selects the 64-kbps PCM digital voice signal output from said decoding means, and said second selection means selects the RTP packet output from said RTP packet assembly means.

5. A device according to claim 1, wherein a pass through frame comprises an RTP packet, delimiter information of the RTP packet, and an identification pattern.

6. A device according to claim 5, wherein the pass through frame comprises a 6-bit RTP packet, 1-bit delimiter information, and a 1-bit identification pattern, which form 8 bits for one cycle.

7. A device according to claim 6, wherein said first frame conversion means permutates an RTP packet for every six bits, and performs a conversion to a voice signal by adding an invalid signal to each free bit produced upon permutation and then adding delimiter information to the signal.

8. A device according to claim 7, wherein said second frame conversion means performs a conversion of the digital voice signal to an RTP packet by removing an identification pattern and an invalid signal on the basis of RTP packet delimiter information which is contained in the digital voice signal.

9. A device according to claim 1, wherein said identification pattern insertion means assigns an identification pattern to an LSB of a 64-kbps PCM signal.

10. A device according to claim 9, wherein said first frame conversion means assigns RTP packet delimiter information to a specific bit other than an LSB of a pass through frame.

11. A digital one-link tandem exchange method in a system including a digital exchange for performing intra- and inter-office tandem exchange of a 64-kbps PCM (Pulse Code Modulation) digital voice signal, a VoIP (Voice over IP network) gateway device for transmitting a signal upon converting the signal into an IP (Internet Protocol) packet, and an IP transit trunk, comprising the steps of:

determining whether connection information received through the exchange is addressed to an intra-office or tandem request information;

if the connection information is tandem request information, inserting an identification pattern of a predetermined bit pattern in a receiving signal from the IP transit trunk and sending out the signal to the digital exchange;

tandeming the sent signal having the identification pattern inserted therein to a predetermined VoIP gateway device;

detecting an identification pattern by monitoring a tandemed signal;

when an identification pattern is detected, converting an RTP (Real-time Transport Protocol) packet converted from a reception IP packet from the IP transit trunk into a digital voice signal in a pass through frame format having a bit rate of 64 kbps;

sending out the converted digital voice signal in the pass through frame format to the digital exchange;

converting the digital voice signal in the pass through frame format tandemed from the digital exchange into an RTP packet; and converting the converted RTP packet into an IP packet and sending out the packet to the IP transit trunk.

12. A method according to claim 11, further comprising the steps of:

when the connection information is a connection request for the intra-office, performing code conversion of the 64-kbps PCM digital voice signal received from the digital exchange according to a high-efficiency coding rule with a low bit rate;

assembling the coded voice signal into an RTP packet;

converting the assembled RTP packet into an IP packet and sending out the packet to the IP transit trunk;

performing buffering to absorb jitter of the RTP packet which is caused in the IP transit trunk;

disassembling a coded voice signal from the RTP packet having undergone buffering;

performing decoding of the disassembled voice signal and outputting the signal as a 64-kbps PCM digital voice signal; and sending out the decoded 64-kbps PCM digital voice signal to the digital exchange.

13. A method according to claim 12, wherein a pass through frame comprises an RTP packet, delimiter information of the RTP packet, and an identification pattern.

14. A method according to claim 13, wherein the pass through frame comprises a 6-bit RTP packet, 1-bit delimiter information, and a 1-bit identification pattern, which form 8 bits for one cycle.

15. A method according to claim 14, wherein the step of converting the signal into the digital voice signal comprises the step of permutating an RTP packet for every six bits, and performing a conversion to a voice signal by adding an invalid signal to each free bit produced upon permutation and then adding delimiter information to the signal.

16. A method according to claim 15, wherein the step of converting the signal into the RTP packet comprises the step of performing a conversion to an RTP packet by removing an identification pattern and an invalid signal on the basis of RTP packet delimiter information.

17. A method according to claim 11, wherein the step of inserting the identification pattern comprises the step of assigning an identification pattern to an LSB of a 64-kbps PCM signal.

18. A method according to claim 17, wherein the step of converting the signal into the digital voice signal comprises the step of assigning RTP packet delimiter information to a specific bit other than an LSB of a pass through frame.

* * * * *